United States Patent
Ferrante et al.

(10) Patent No.: US 10,419,085 B2
(45) Date of Patent: Sep. 17, 2019

(54) JOINT CHANNEL CODING AND MODULATION IN WIRELESS SYSTEMS

(71) Applicant: IDAC Holdings, Inc., Wilmington, DE (US)

(72) Inventors: Steven Ferrante, Doylestown, PA (US); Robert L Olesen, Huntington, NY (US); Kyle Jung-Lin Pan, Saint James, NY (US); Fengjun Xi, San Diego, CA (US); Hanqing Lou, Syosset, NY (US)

(73) Assignee: IDAC Holdings, Inc., Wilmington, DE (US)

( * ) Notice: Subject to any disclaimer, the term of this patent is extended or adjusted under 35 U.S.C. 154(b) by 0 days.

(21) Appl. No.: 16/099,965

(22) PCT Filed: May 9, 2017

(86) PCT No.: PCT/US2017/031655
§ 371 (c)(1),
(2) Date: Nov. 8, 2018

(87) PCT Pub. No.: WO2017/196780
PCT Pub. Date: Nov. 16, 2017

(65) Prior Publication Data
US 2019/0149199 A1    May 16, 2019

Related U.S. Application Data

(60) Provisional application No. 62/334,737, filed on May 11, 2016.

(51) Int. Cl.
*H04B 7/02*    (2018.01)
*H04B 7/06*    (2006.01)
(Continued)

(52) U.S. Cl.
CPC ....... *H04B 7/0417* (2013.01); *H04L 25/0204* (2013.01); *H04L 25/0228* (2013.01); *H04B 7/0634* (2013.01)

(58) Field of Classification Search
CPC . H04B 7/0417; H04B 7/0634; H04L 25/0204; H04L 25/0228
(Continued)

(56) References Cited

U.S. PATENT DOCUMENTS 7,088,784 B2    8/2006  Borran et al.
8,031,793 B2   10/2011  Ionescu et al.
(Continued)

FOREIGN PATENT DOCUMENTS

EP          2875603         9/2016
WO     WO-2010/094960        8/2010
WO   WO-2017196780 A1 *  11/2017   ........... H04L 1/0058

OTHER PUBLICATIONS

Gencer Yilmaz et al., "Trellis Coded Space-Shift Keying Modulation," 2014, IEEE, 5 pages.*
(Continued)

*Primary Examiner* — Tesfaldet Bocure
(74) *Attorney, Agent, or Firm* — Yin Shao

(57) ABSTRACT

Methods are described for performing joint coded spatial and/or antenna based modulation. A first device may receive, from a second device, one or more pilot signals associated with one or more transmit antennas, antenna patterns, and/or antenna polarizations. The first device may determine channel related information associated with an antenna pair based on the pilot signals. The channel related information may include one or more channel cross correlation coefficients. The first device may determine a set-partition, for example, based on the channel related information. The first device may configure a dynamically configurable Trellis (Continued)

Coded Modulation (TCM) decoder based on the determined set-partition.

20 Claims, 13 Drawing Sheets

(51) Int. Cl.
  *H04B 7/08* (2006.01)
  *H04B 7/0417* (2017.01)
  *H04L 25/02* (2006.01)
(58) Field of Classification Search
  USPC ....... 375/267, 265, 295, 299, 316, 329, 332, 375/340, 341
  See application file for complete search history.

(56) References Cited

U.S. PATENT DOCUMENTS

| | | | |
|---|---|---|---|
| 8,218,464 | B2 | 7/2012 | Maltsev et al. |
| 9,065,623 | B1 | 6/2015 | Chen et al. |
| 2005/0047517 | A1 | 3/2005 | Georgios et al. |
| 2007/0127586 | A1 | 6/2007 | Hafeez |
| 2016/0352362 | A1* | 12/2016 | Fonseka ............ H03M 13/2906 |

OTHER PUBLICATIONS

"Recommendation ITU-R M.2083-0—IMT Vision—Framework and overall objectives of the future development of IMT for 2020 and beyond", International Telecommunication Union ITU-R; M Series—Mobile, radiodetermination, amateur and related satellite services., Sep. 2015, 21 pages.
Behairy, Hatim M., et al., "Parallel concatenated Gallager codes", Electronics Letters, vol. 36, No. 24., Nov. 23, 2000, 2 pages.
Christodoulou, Christos G., et al., "Reconfigurable Antennas for Wireless and Space Applications", Proceedings of the IEEE | vol. 1 100, No. 7, Apr. 5, 2012, 12 pages.
Harada, Masaaki, et al., "OFDM Systems with Multiple Trellis Coded Modulation", 11th IEEE International Symposium on Personal Indoor and Mobile Radio Communications. PIMRC 2000. Proceedings (Cat. No. 00TH8525), London, UK; (available at https://pdfs.semanticscholar.org/69c5/37df108e78ff517bbf75f66058a03475d82b.pdf), Sep. 18-21, 2000.
Lau, Vincent, et al., "Channel-Adaptive Technologies and Cross-Layer Designs for Wireless Systems with Multiple Antennas—Theory and Applications", Wiley Series in Telecommunications and Signal Processing (Book 85); Wiley-Interscience; 1st edition., Feb. 10, 2006, 544 pages.
NGMN Alliance, "5G White Paper", Next Generation Mobile Networks (NGNM); Version 1.0, Feb. 17, 2015, 125 pages.
Raed, Mesleh, et al., "Trellis Coded Spatial Modulation", IEEE Transactions on Wireless Communications, vol. 9, No. 7, Jul. 15, 2010, 13 pages.

* cited by examiner

JOINT CHANNEL CODING AND MODULATION IN WIRELESS SYSTEMS

CROSS-REFERENCE TO RELATED APPLICATIONS

This application is a national stage application under 35 U.S.C. § 371 of International Application No. PCT/US2017/031655, filed May 9, 2017, which claims the priority to U.S. provisional patent application No. 62/334,737, filed May 11, 2016, which is incorporated herein by reference in its entirety, for all purposes.

BACKGROUND

Mobile communications are in continuous evolution and are already at the doorstep of its fifth incarnation—5G. 5G networks may support new features and stringent performance requirements. As new technologies related to 5G continue to emerge, challenges arise in determining how to support a wide variety of 5G usage cases in areas of such as Enhanced Mobile Broadband (eMBB), Massive Machine Type Communications (mMTC) and Ultra Reliable and Low latency Communications (URLLC).

SUMMARY

Systems, methods and instrumentalities are disclosed for performing joint coded spatial and/or antenna based modulation. A first device may receive a first pilot signal from a second device. The first device may be a wireless transmit/receive unit (WTRU). The second device may be an eNodeB. The first pilot signal may be associated with a first transmit antenna (e.g., a first transmit antenna pattern and/or polarization) of the second device. The first device may receive a second pilot signal form the second device. The second pilot signal may be associated with a second transmit antenna (e.g., a second transmit antenna pattern and/or polarization) of the second device. The first device may determine channel related information associated with an antenna pair, for example, a transmit/receive antenna pair. The channel related information may be determined based on the first and/or second pilot signals. The channel related information may include one or more channel cross correlation coefficients.

The first device may determine a set-partition, for example, based on the channel related information. The first device may partition a higher order signal space constellation into a first group of constellation subsets. The higher order signal space constellation may include a plurality of constellation points. The plurality of constellation points may be assigned to subsets in the first group. The first device may partition the first group of constellation subsets into a second group of constellation subsets. The plurality of constellation points may be assigned to constellation subsets in the second group. A minimum distance between the plurality of constellation points may be increased (e.g., maximized) with each partitioning. The first group of constellation subsets and the second group of constellation subsets may have the same respective number of constellation points as the higher order signal space constellation. The first device may map bits (e.g., information bits) to the plurality of constellation points assigned to the second group of constellation subsets.

The first device may determine one or more spatial correlation coefficients for a plurality of transmit antennas (e.g., transmit antenna patterns and/or polarizations). The plurality of transmit antennas may comprise the first transmit antenna and the second transmit antenna. The first device may determine a first partition and a second partition for the plurality of transmit antennas (e.g., antenna patterns and/or polarizations). The first partition and the second partition may be determined such that a minimum distance between antennas is maximized for each respective partition. The first device may configure a dynamically configurable Trellis Coded Modulation (TCM) decoder. The dynamically configurable TCM decoder may be configured based on the determined set-partition. The dynamically configurable TCM decoder may be configured to decode data received from the second device. The first device may send feedback to the second device. The feedback may indicate the determined set-partition. The feedback may include one or more of the channel related information or an antenna index associated with the determined set-partition. The feedback may be sent via one or more of a control channel or a PHY header. The feedback may enable the second device to configure a dynamically configurable TCM encoder. The dynamically configurable TCM encoder may correspond to the dynamically configurable TCM decoder. The first device may receive the data from the second device. The first device may determine an estimated antenna index. The first device may map the estimated antenna index to a bit sequence of the data. The first device may decode the mapped bit sequence using the dynamically configurable TCM decoder.

DETAILED DESCRIPTION

A detailed description of illustrative embodiments will now be described with reference to the various Figures.

Although this description provides a detailed example of possible implementations, it should be noted that the details are intended to be exemplary and in no way limit the scope of the application.

Figure 1A:
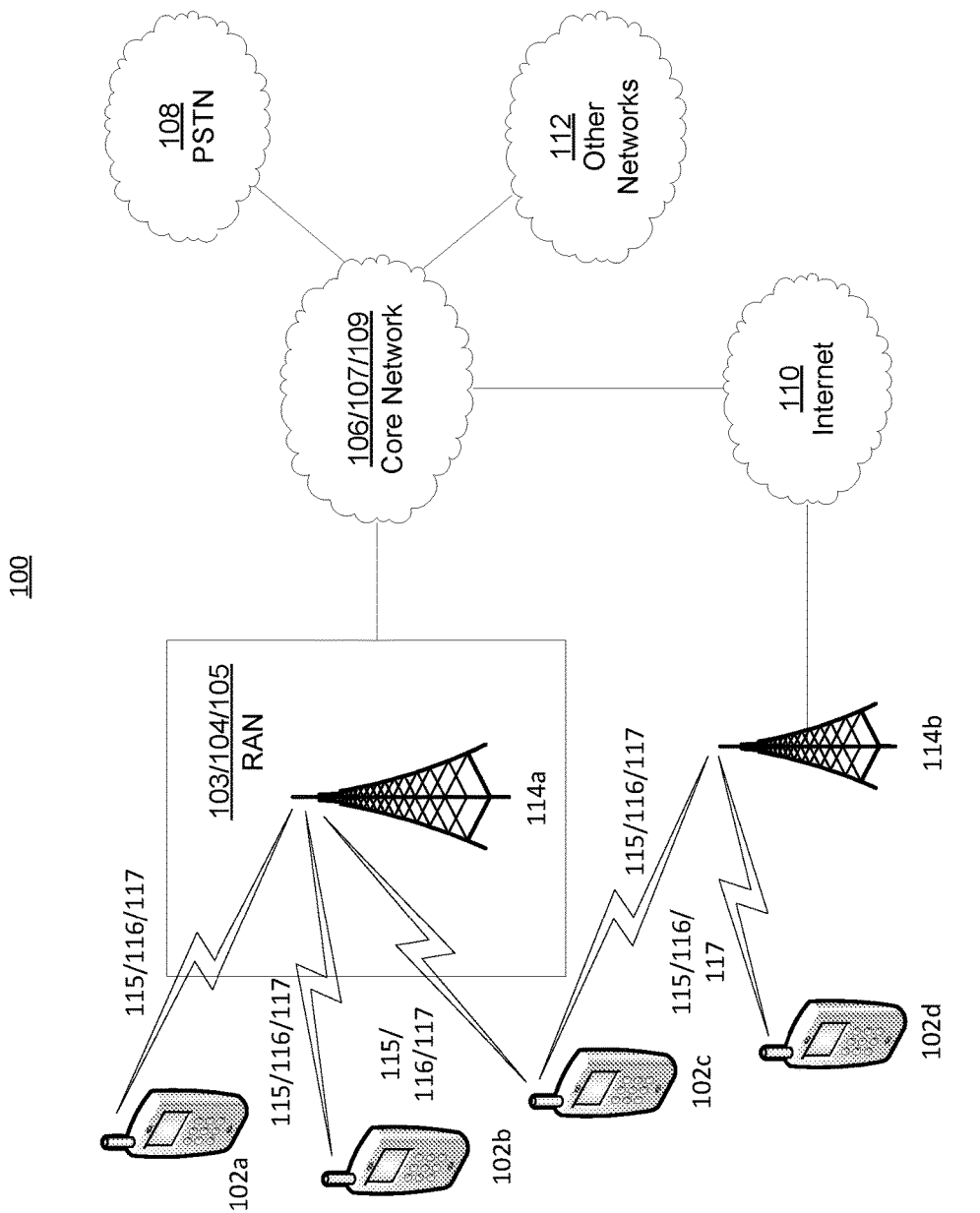
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), orthogonal frequency-division multiplexing with offset quadrature amplitude modulation (OFDM-OQAM), universal filtered orthogonal frequency-division multiplexing (UF-OFDM), and the like.

As shown in FIG. 1A, the communications system 100 may include wireless transmit/receive units (WTRUs) 102a, 102b, 102c, and/or 102d (which generally or collectively may be referred to as WTRU 102), a radio access network (RAN) 103/104/105, a core network 106/107/109, a public switched telephone network (PSTN) 108, the Internet 110, and other networks 112, though it will be appreciated that the disclosed embodiments contemplate any number of WTRUs, networks, and/or network elements.

The communications systems 100 may also include a number of base stations, e.g., base station 114a and base station 114b. Each of the base stations 114a, 114b may be any type of device configured to wirelessly interface with at least one of the WTRUs 102a, 102b, 102c, 102d to facilitate access to one or more communication networks, such as the core network 106/107/109, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 115/116/117, which may be any suitable wireless communication link (e.g., radio frequency (RF), microwave, infrared (IR), ultraviolet (UV), visible light, etc.). The air interface 115/116/117 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, OFDM-OQAM, UF-OFDM and the like. For example, the base station 114a in the RAN 103/104/105 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 115/116/117 using Long Term Evolution (LTE), LTE-Advanced (LTE-A) and/or 5gFLEX.

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, 5gFLEX, etc.) to establish a picocell or femtocell. As shown in FIG. 1A, the base station 114b may have a direct connection to the Internet 110. Thus, the base station 114b may not be required to access the Internet 110 via the core network 106/107/109

The RAN 103/104/105 may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication. Although not shown in FIG. 1A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
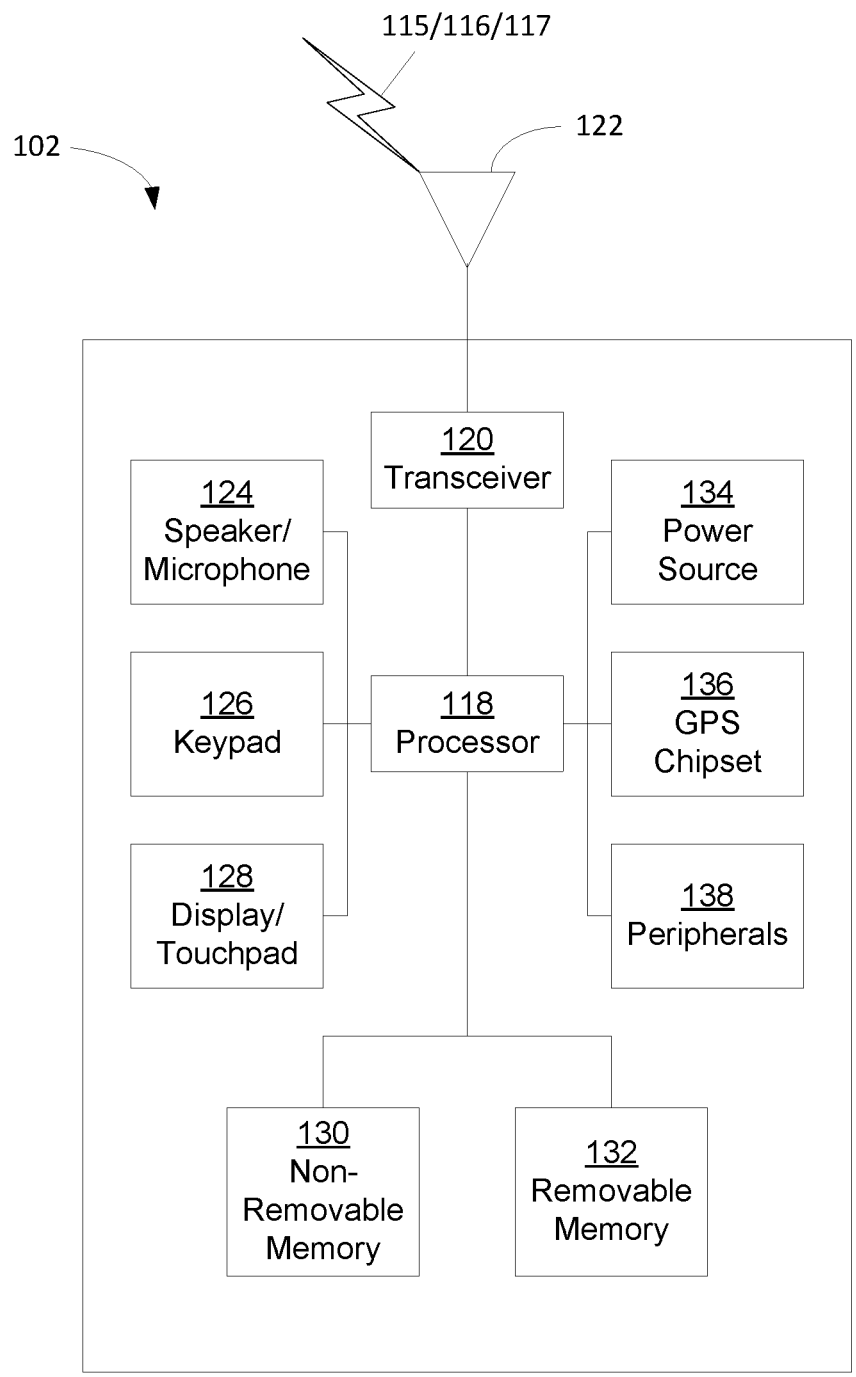
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRUs 102a, 102b, 102c, 102d may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 of the WTRU 102 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 of the WTRU 102 may be configured to transmit signals to, or receive signals from, a base station (e.g., the base station 114a) over the air interface 115/116/117. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 115/116/117.

The transceiver 120 of the WTRU 102 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer.

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
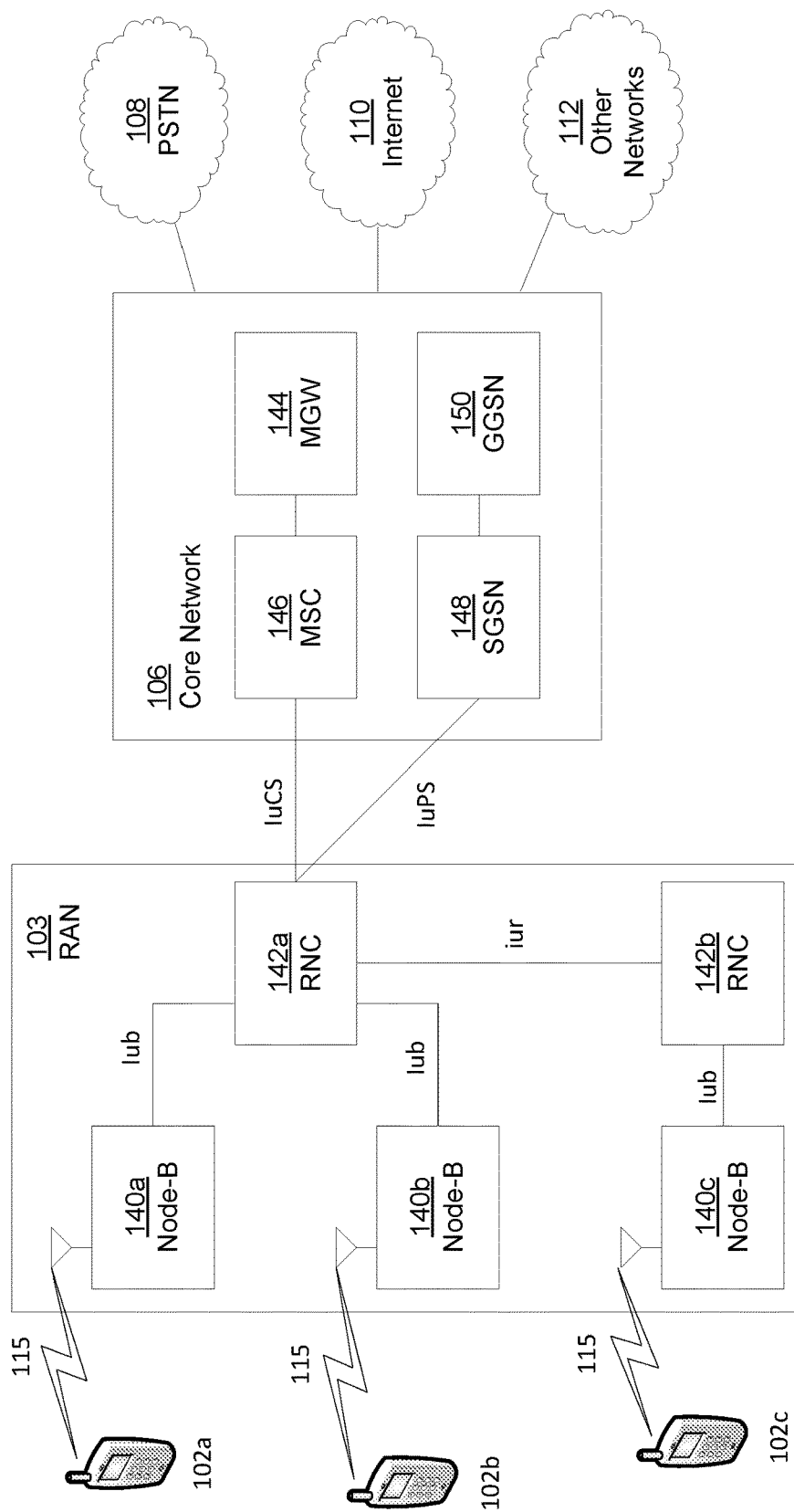
FIG. 1C is a system diagram of an example radio access network and an example core network that may be used within the communications system illustrated in FIG. 1A.

FIG. 1C is a system diagram of the RAN 103 and the core network 106 according to an embodiment. As noted above, the RAN 103 may employ a UTRA radio technology to communicate with the WTRUs 102a, 102b, 102c over the air interface 115. The RAN 103 may also be in communication with the core network 106. As shown in FIG. 1C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 1D:
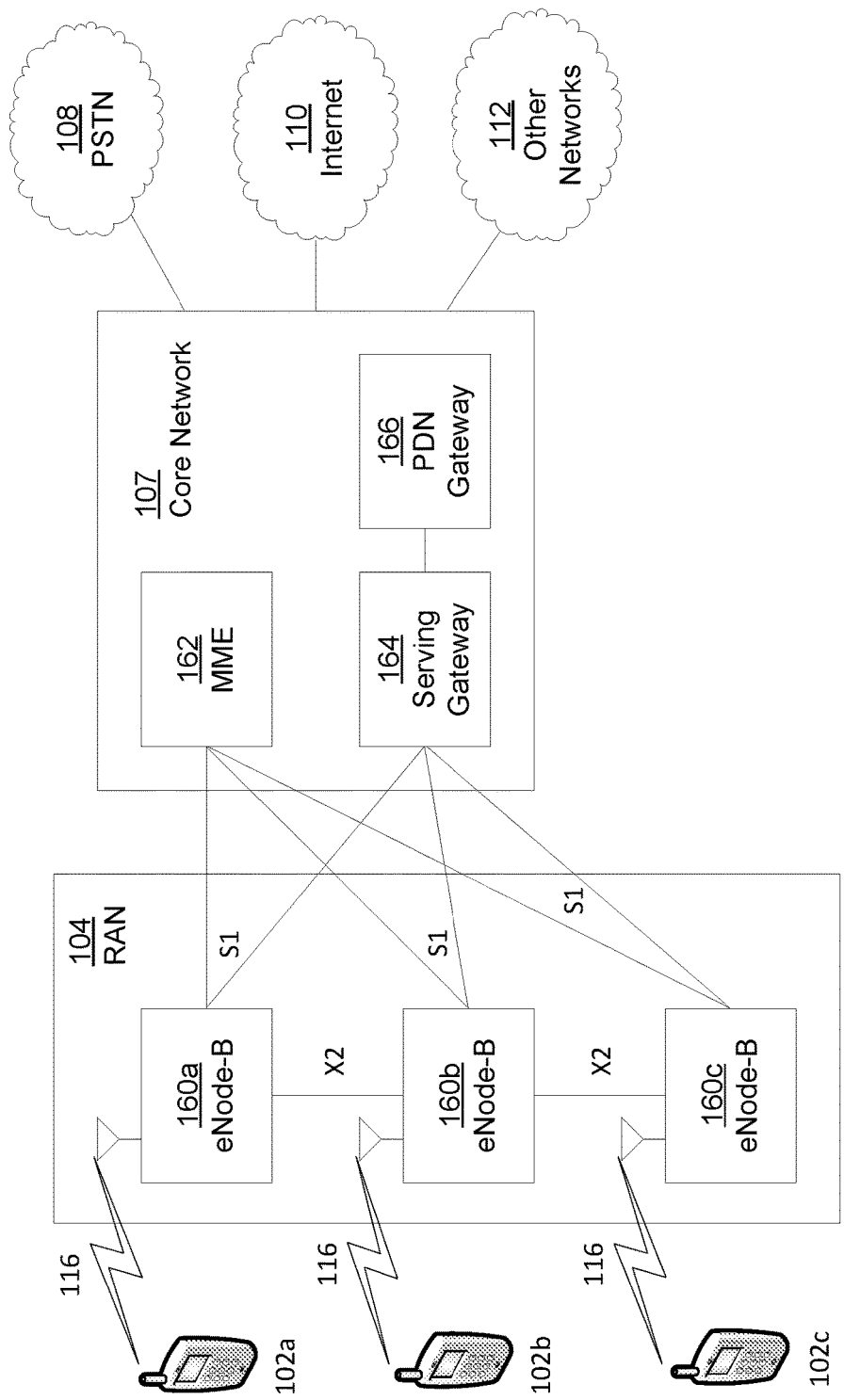
FIG. 1D is a system diagram of another example radio access network and an example core network that may be used within the communications system illustrated in FIG. 1A.

FIG. 1D is a system diagram of the RAN 104 and the core network 107 according to an embodiment. As noted above, the RAN 104 may employ an E-UTRA radio technology to communicate with the WTRUs 102a, 102b, 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, 160c may be associated with a particular cell (not shown) and may be configured to handle radio resource management decisions, handover decisions, scheduling of users in the uplink and/or downlink, and the like. As shown in FIG. 1D, the eNode-Bs 160a, 160b, 160c may communicate with one another over an X2 interface.

The core network 107 shown in FIG. 1D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 1E:
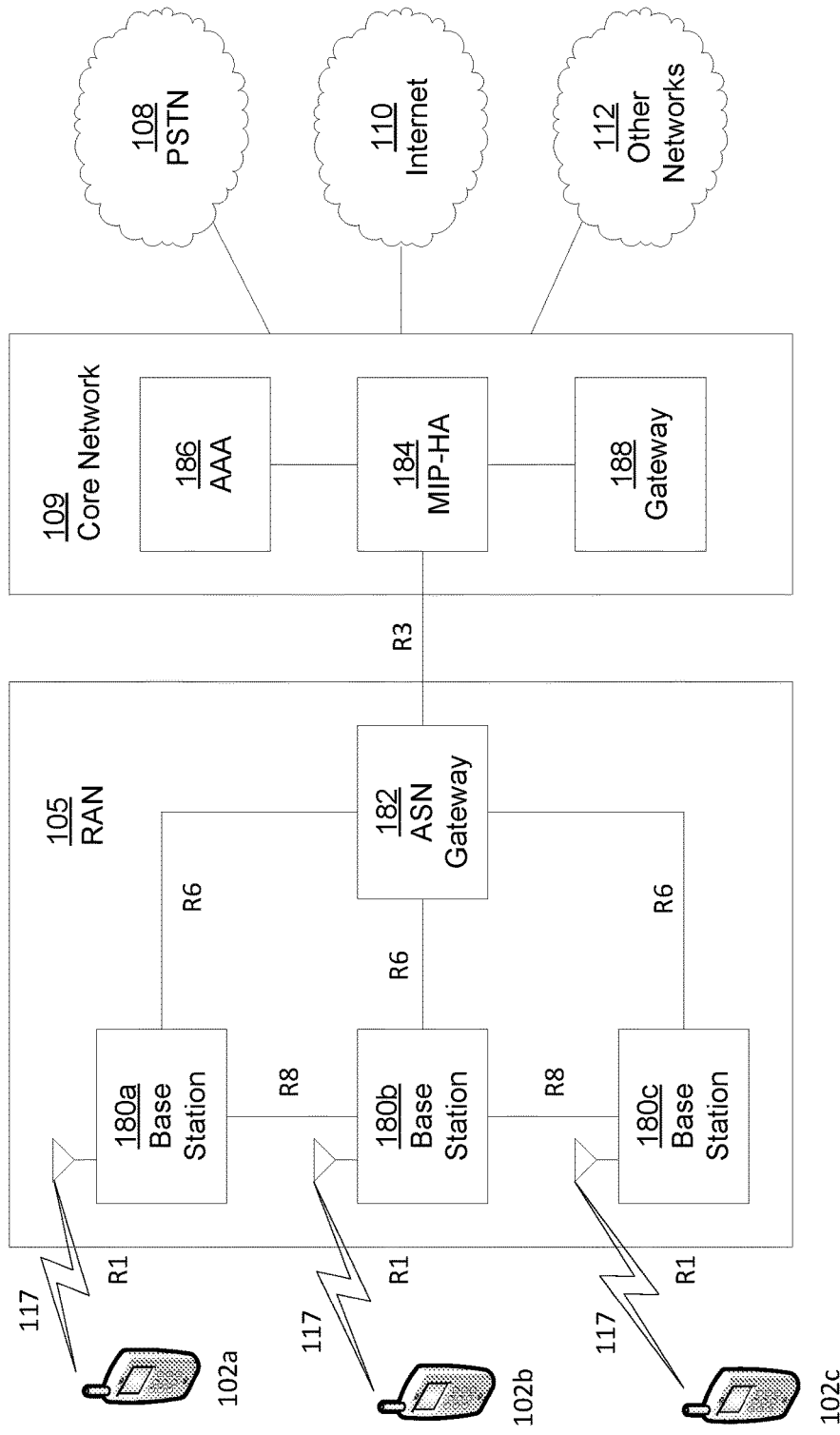
FIG. 1E is a system diagram of another example radio access network and an example core network that may be used within the communications system illustrated in FIG. 1A.

FIG. 1E is a system diagram of the RAN 105 and the core network 109 according to an embodiment. The RAN 105 may be an access service network (ASN) that employs IEEE 802.16 radio technology to communicate with the WTRUs 102a, 102b, 102c over the air interface 117. As will be further discussed below, the communication links between the different functional entities of the WTRUs 102a, 102b, 102c, the RAN 105, and the core network 109 may be defined as reference points.

As shown in FIG. 1E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell (not shown) in the RAN 105 and may each include one or more transceivers for communicating with the WTRUs 102a, 102b, 102c over the air interface 117. In one embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 1E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 1E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

The communication system described herein may be implemented for different use cases. These use cases may have different operational requirements including, for example, high data rate, high spectrum efficiency, low power and high energy efficiency, low latency, and high reliability, etc. As an example, mMTC use cases may be characterized by the desire to provide connectivity for a large number of low cost devices. Target applications may include smart metering, home appliances, remote sensors, and/or the like. In one or more of these applications (e.g., in all of these application), data transmissions may be small and/or infrequent. To achieve massive deployments, low cost devices with extended battery life may be used.

The communication system described herein may employ spatial modulation multiple input multiple output (SM-MIMO) techniques through which information (e.g., which may be modulated onto a conventional signal space) may be modulated onto antenna indices at a transmitter. Using SM-MIMO, the number of radio frequency (RF) chains may be less than the number of transmit antennas, thus reducing overall cost and/or power consumption (e.g., in comparison to certain MIMO techniques not using spatial modulation and/or in comparison to MIMO techniques requiring an RF chain per antenna). SM-MIMO may target energy efficiency (EE) (e.g., over spectrum efficiency (SE)).

The communication system described herein may employ a link adaptation technique with which certain transmit parameters may be dynamically configured (e.g., based on channel related information such as channel conditions). An example link adaption may be adaptive modulation and coding (AMC). With AMC, modulation and coding may be adjusted, for example, based on the current channel conditions and/or a desired error probability, e.g., so that spectral efficiency may be enhanced.

The communication system described herein may employ MIMO technologies, for example, to enhance spectral efficiency. For example, a MIMO technique called spatial multiplexing (SMX) may allow multiple simultaneous data streams to be transmitted and/or received over the same radio channel. SMX may be performed under specific channel conditions. The link adaptation technique described herein may be applied by dynamically adjusting the SMX mode, for example, based on channel related information such as channel conditions.

Figure 2:
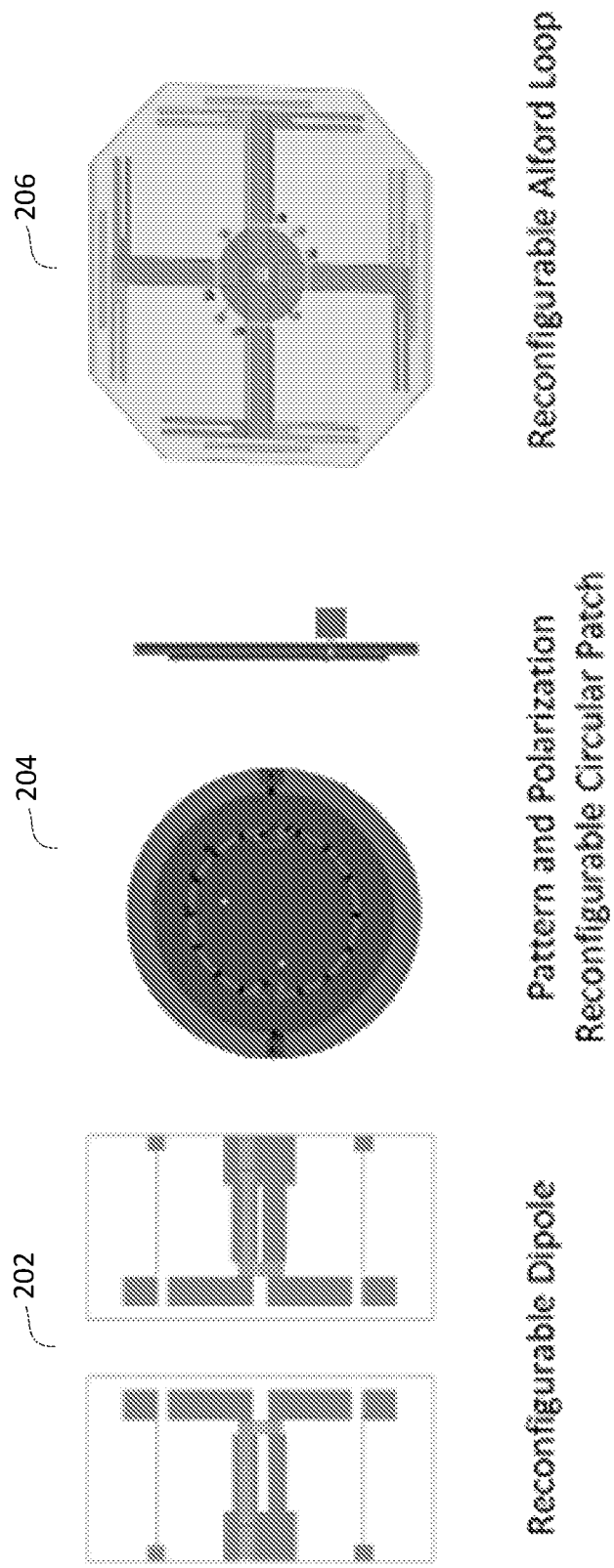
FIG. 2 shows example reconfigurable antennas.

FIG. 2 shows example reconfigurable antennas. The communication system described herein may utilize reconfigurable antennas (e.g., electrically reconfigurable antennas). These reconfigurable antennas may be capable of dynamically reshaping themselves and/or changing their radiation characteristics. The dynamic reshaping may be realized, for example, by integrating PIN/varactor diodes and/or microelectromechanical systems (MEMS) devices into the structure of the antenna. Electrical control may be exercised over one or more of components of the antenna. The example reconfigurable antennas shown in FIG. 2 may include a reconfigurable dipole antenna 202, a pattern and polarization reconfigurable circular patch antenna 204, and a reconfigurable Alford loop antenna 206.

Reconfigurable antennas may be classified into different categories. A first example category may comprise radiating structures capable of changing their operating or notch frequencies, for example by hopping between different frequency bands. These radiating structures may be referred to as frequency reconfigurable antennas, for which tuning or notch may be produced in the respective antenna reflection coefficients. A second example category may comprise radiating structures capable of adjusting their radiation patterns. Radiating structures capable of adjusting their radiation patterns may be referred to as radiation pattern reconfigurable antennas. The radiation patterns of radiation pattern reconfigurable antennas may change in terms of shape, direction, gain, etc. A third example category may comprise radiating structures capable of changing their polarization characteristics. Polarization characteristics may include one or more of horizontal/vertical, slant, left-hand, or right-hand circular polarized. These radiating structures may be referred to as polarization reconfigurable antennas. Polarization reconfigurable antennas may be able to change their respective polarizations, for example, from vertical polarization to left-hand circular polarization. A fourth example category may comprise radiating structures with a combination of characteristics described in association with the first three categories. For example, an antenna in the fourth example category may be characterized by reconfigurable frequencies and polarization diversity at the same time.

The communication system described herein may employ certain channel coding techniques. Channel coding may enhance the performance of the communication system, for example by introducing redundancy into transmissions. Specific channel coding techniques may be selected for a specific application. Channel codes that may be utilized may be classified into block codes (e.g., where redundancy is added to blocks of data) and/or convolutional codes (e.g., where redundancy is added in a continuous fashion).

The communication system described herein may employ certain modulation techniques. Data bits may be mapped to a different domain in order to make the transmission of information comprised in the data bits over an analog channel feasible. For instance, data bits may be mapped to the signal domain, which may result in common modulation formats such as BPSK, QPSK, and QAM. Signal domain modulation may be represented by a signal-space constellation diagram (e.g., where one or more points in the constellation refer to respective signal mappings). The number of bits used to represent an individual signal may increase as the number of utilized constellation points increases. In that scenario, if transmit power remains unchanged, the constellation points may become closer to each other, which may affect (e.g., directly affect) the BER performance.

Channel coding and modulation may be designed as separate entities. For instance, a specific information bit rate and desired target bit error rate (BER) may be targeted. If channel coding is used to reach the target BER, the information bit rate (e.g., assuming a fixed bandwidth) may be reduced because of the redundancy added to the information bit stream. This reduction in the information rate may be handled, for example by using a higher order modulation format. The higher order modulation format, however, may decrease the distance between constellation points, which may in turn have a negative effect on the BER performance. For example, either an uncoded BPSK transmission or a 1/3 rate coded 8-PSK transmission may provide a spectral efficiency of one bit per channel use (bpcu). Using the same transmit power, however, the distance between constellation points for the coded 8-PSK may be approximately 2.6 times less than the distance between constellation points for the uncoded BPSK. As such, overall gains relative to the uncoded system may be achieved via channel coding after (e.g., only after) overcoming the higher order modulation penalty.

Channel coding and modulation may be jointly designed (e.g., for a coded modulation system). By designing the coding and modulation jointly, the overall performance of the system may be enhanced (e.g., in terms of requiring a smaller signal-to-noise ratio (SNR) for the same spectral efficiency). Trellis coded modulation (TCM) may be used as a joint coded modulation technique. A joint coded modulation may add redundancy by increasing the dimension of the signal space (e.g., while simultaneously disallowing certain symbol sequences).

Technology development may be driven by attempts to increase spectral efficiency. For example, certain MIMO technologies may bring an increase in spectral efficiency, but may do so at the cost of increased circuit power dissipation at the transmitter and/or increased signal processing complexity at the receiver. SM-MIMO may have the potential to enhance spectral efficiency and energy efficiency, and/or to achieve a balance between spectral efficiency and energy efficiency.

As described herein, mMTC deployments may be characterized by the use of low cost devices (e.g., because of the large number of devices deployed) with extended battery life. While data rates may be low in some mMTC applications, the demand for higher data rates may be possible. It may be desirable to design mMTC systems using low cost and energy efficient devices that are capable of achieving a balance between EE and SE.

SM-MIMO techniques may be used in mMTC use cases, e.g., due to their low cost device architectures and/or energy efficient operations. Other antenna based modulation, channel coding, and link adaptation techniques may be utilized to extract spectral efficiency from a channel. The design of mMTC systems may aim at achieving a balance of spectral and energy efficiencies (e.g., for high frequency and wide bandwidth operations), for example by focusing on one or more of the techniques described herein.

Joint coded spatial and/or antenna based modulation may be used. As described herein, increased spectral efficiency and/or energy efficiency may be design goals (e.g., for 5G and/or mMTC use cases). MIMO techniques, such as spatial multiplexing, may increase spectral efficiency, but may affect energy efficiency. Spatial and/or antenna based modulation techniques, such as space shift keying (SSK) and radiation pattern/polarization modulation (RPM), may be used (e.g., alternatively used) to enhance spectral efficiency (e.g., at a modest rate) while maintaining energy efficiency.

Joint channel coding and modulation may be combined with spatial and/or antenna based modulation. The combination may enhance performance while preserving spectral efficiency and keeping coding schemes relatively simple. TCM is an example joint coding and modulation technique that may be used with signal space modulation. The technique may be suitable for other modulation types (e.g., such as SSK and RPM, as described herein).

Figure 3:
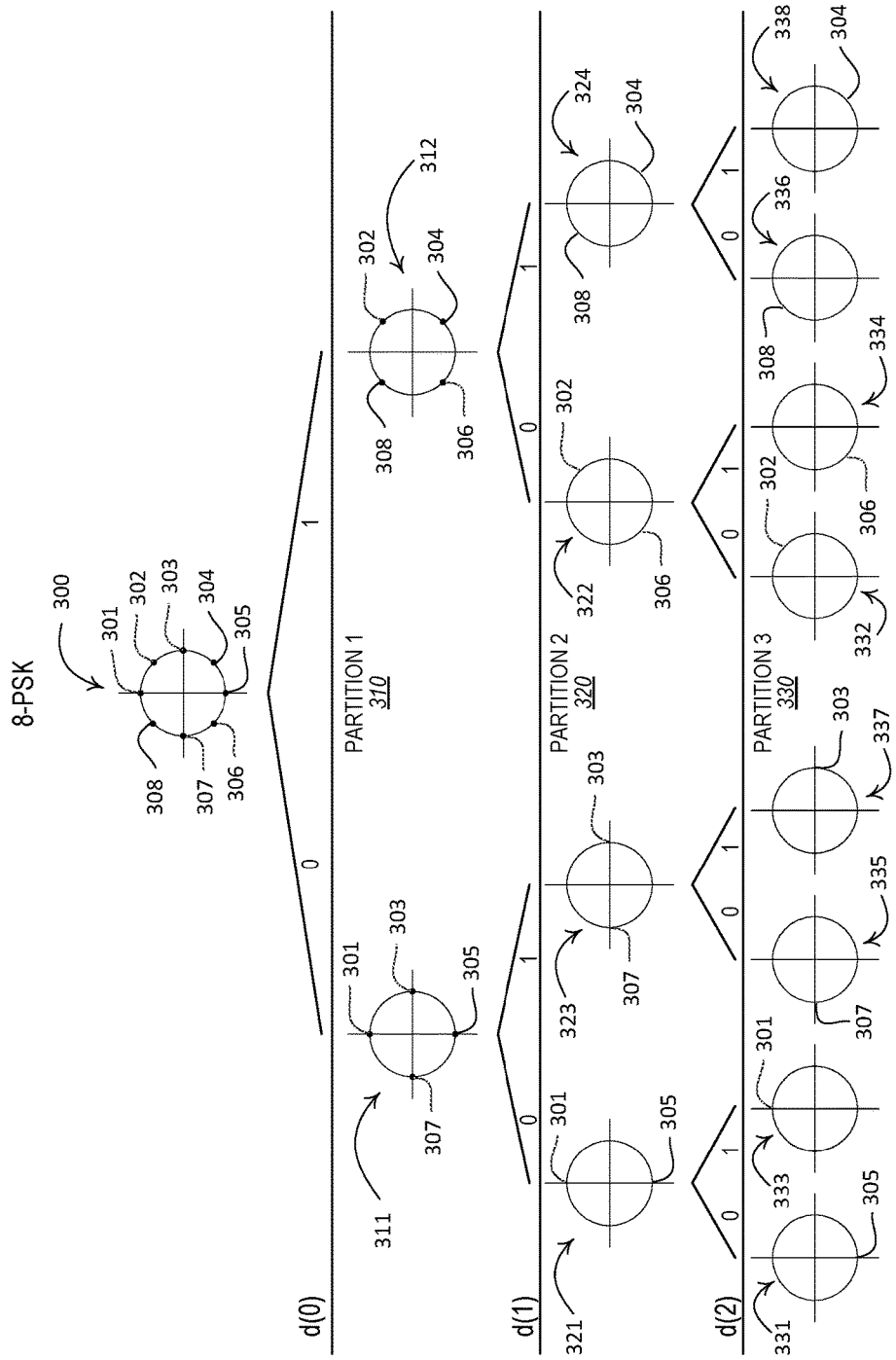
FIG. 3 is an illustration of an example set-partitioning design for an 8-PSK constellation.

Certain set-partitioning techniques used with TCM may be suitable for signal space modulation, but may not directly map to the spatial and/or antenna based modulation types described herein. Set-partitioning may be used for spatial and/or antenna based modulation types. An example set-partitioning may be illustrated as follows. A constellation of a higher order than that associated with the desired information symbol rate may be selected. The constellation may have a plurality of constellation points. The constellation (e.g., higher order constellation) may be partitioned (e.g., consecutively partitioned) into subsets. The constellation may be partitioned such that the distances (e.g., the minimum distances) between the constellation points are increased with the partition. For example, the partitioning may continue as illustrated in FIG. 3 (e.g., presented as an example for 8-PSK). Data bits may be mapped to partitioned constellation points. For example, data bits may be mapped to partitioned constellation points in such a way that not all symbol sequences may be resultant, which may in turn provide coding protection.

A constellation may be partitioned two or more times. Each partitioning may include assigning the constellation points to two or more constellation subsets. The constellation points may be assigned to the constellation subsets to maximize the distance between the constellation points. Each of the constellation subsets may be assigned an equal number of constellation points. The constellation points in each respective partitioning may equal the total number of constellation points in the constellation.

FIG. 3 shows an example set-partitioning. A constellation 300 may include a plurality of constellation points 301, 302, 303, 304, 305, 306, 307, 308. The constellation 300 may be associated with an 8-PSK transmission. The constellation 300 may be partitioned into a first group of constellation subsets 311, 312. For example, the constellation 300 may be partitioned into a first partition 310. The first partition 310 may include a first constellation subset 311 and a second constellation subset 312. The first constellation subset 311 and the second constellation subset 312 may be a part of the first group of constellation subsets. The constellation points 301, 302, 303, 304, 305, 306, 307, 308 may be divided between (e.g., assigned to) the first constellation subset 311 and the second constellation subset 312. For example, the constellation points 301, 303, 305, 307 may be assigned to the first constellation subset 311. The constellation points 302, 304, 306, 308 may be assigned to the second constellation subset 312.

The first constellation subset 311 and the second constellation subset 312 may be partitioned into a second partition 320. For example, the first group of constellation subsets 311, 312 may be partitioned into a second group of constellation subsets. The second group of constellation subsets may include constellation subsets 321, 322, 323, 324. The first constellation subset 311 may be partitioned into two or more constellation subsets 321, 323. The constellation points 301, 303, 305, 307 assigned to the first constellation subset 311 may be divided between (e.g., assigned to) the constellation subsets 321, 323. For example, constellation points 301, 305 may be assigned to constellation subset 321 and constellation points 303, 307 may be assigned to constellation subset 323. The second constellation subset 312 may be partitioned into two or more constellation subsets 322, 324. The constellation points 302, 304, 306, 308 may be assigned to constellation subsets 322, 324. For example, constellation points 302, 306 may be assigned to constellation subset 322 and constellation points 304, 308 may be assigned to constellation subset 324.

The constellation subsets 321, 322, 323, 324 may be partitioned into a third partition 330. For example, the second group of constellation subsets may be partitioned into a third group of constellation subsets. The third group of constellation subsets may include constellation subsets 331, 332, 333, 334, 335, 336, 337, 338. Constellation subset 321 may be partitioned into constellation subsets 331, 333. The constellation points 301, 305 assigned to constellation subset 321 may be divided between (e.g., assigned to) the constellation subsets 331, 333. For example, constellation point 305 may be assigned to constellation subset 331 and constellation point 301 may be assigned to constellation subset 333. The constellation points 303, 307 assigned to constellation subset 323 may be assigned to the constellation subsets 335, 337. For example, constellation point 307 may be assigned to constellation subset 335 and constellation point 303 may be assigned to constellation subset 337. The constellation points 302, 306 assigned to constellation subset 322 may be assigned to the constellation subsets 332, 334. For example, constellation point 302 may be assigned to constellation subset 332 and constellation point 306 may be assigned to constellation subset 334. The constellation points 304, 308 assigned to constellation subset 324 may be assigned to the constellation subsets 336, 338. For example, constellation point 308 may be assigned to constellation subset 336 and constellation point 304 may be assigned to constellation subset 338.

The set-partitioning may be performed by a device (e.g., a transmitter and/or a receiver). When the set-partitioning is performed by a receiver, the receiver may send feedback to the transmitter that indicates the determined set-partition.

For certain signal space modulation techniques, a TCM system may be a-priori designed, e.g., based on the fact that one or more constellation points are fixed (e.g., for all time). Spatial constellations for SSK and RPM may not be fixed or a-priori known (e.g., in conventional systems). Spatial constellations for SSK and/or RPM may be functions of properties such as antenna spacing, radiation patterns, and/or the current propagation channel. The corresponding set-partitioning of the spatial constellations for SSK and/or RPM may require metrics that are functions of these properties (e.g., spatial and/or antenna based properties). For example, a set-partitioning may be determined based on channel related information. The set-partitioning may be a-priori designed based on, e.g., physical antenna spacing and/or antenna pattern correlation properties. The set-partitioning may be designed to be semi-static, for example, based on various channel related information (e.g., channel state information (CSI)) from the receiver. The channel related information may be associated with an antenna pair. The antenna pair may be a transmit/receive antenna pair.

Set-partitioning may be based on non-channel related information (e.g., non-CSI based). The constellation points for signal space modulation may be fixed, e.g., based on the modulation format (e.g., 8-PSK as shown in FIG. 3). Being able to distinguish between these fixed constellation points at the receiver may allow for successful reception of the information. In an example, as the distance between constellation points become larger, performance may improve.

Set partitioning for signal space modulation may use the Euclidean distance between constellation points as criteria (e.g., primary criteria). For example, the partitioning (e.g., as shown in FIG. 3) may be performed in a way to increase (e.g., maximize) the Euclidean distance (e.g., the minimum Euclidean distance) for a succeeding partition (e.g., for each successive partition). Spatial and/or antenna based modulations may utilize the differences in the constellation points, for example, to achieve reliable reception. Not having a-priori knowledge of the constellation points may prevent the distances between the constellation points from being used directly in set-partitioning (e.g., as they may be used for signal space modulation). A set-partitioning metric (e.g., a non-channel information based metric) may be desirable for the spatial and/or antenna based modulation described herein. Example set-partitioning metrics that may be based on non-channel related information are listed herein. A first example set-partitioning metric may comprise the distances between physical antenna elements for SSK based transmissions. A second example set-partitioning metric may comprise the antenna pattern spatial correlation coefficients for RPM based transmissions. A third example set-partitioning metric may comprise a combination of the foregoing information for combined SSK-RPM based transmissions.

Figure 4:
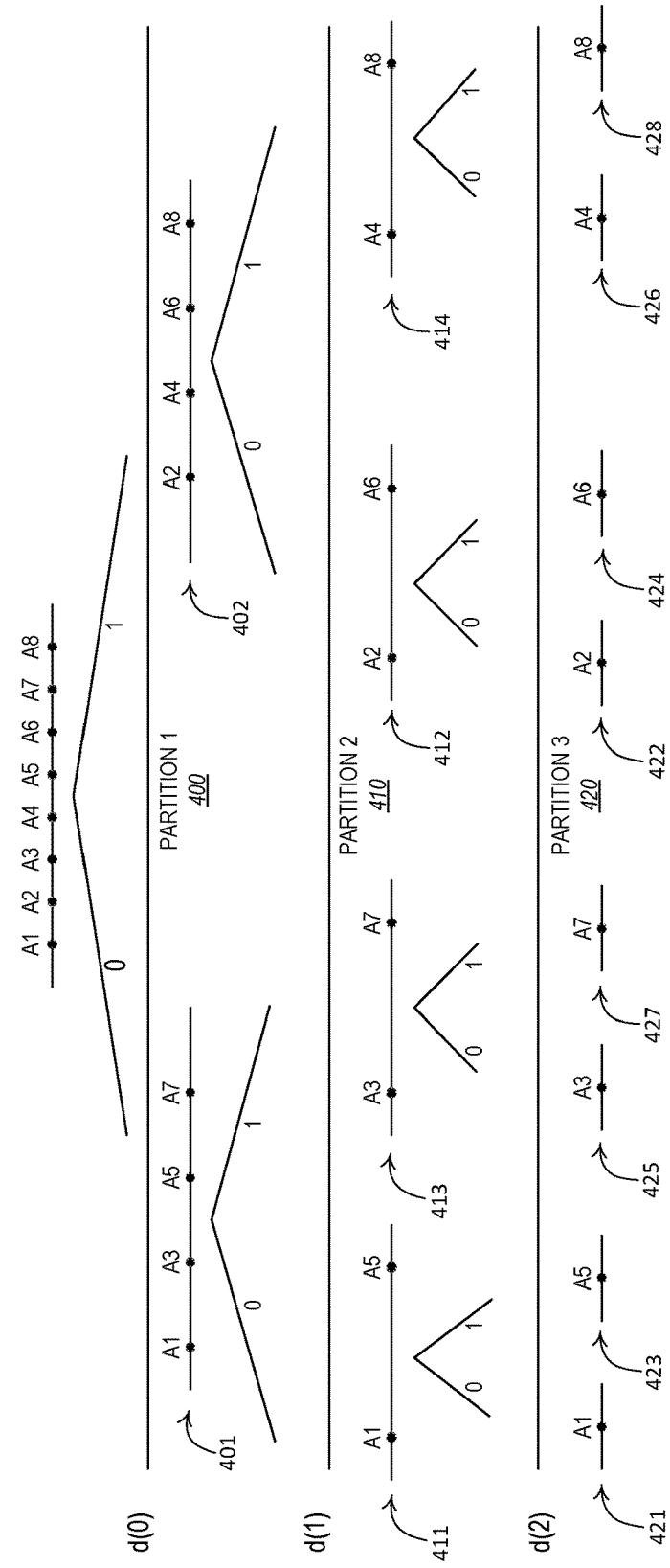
FIG. 4 is an illustration of an example design for SSK antenna separation based set partitioning.

FIG. 4 illustrates an example set-partitioning design for an SSK based system using eight evenly spaced antenna elements. Compared to the example set-partitioning shown in FIG. 3 (where the distances between signal space constellation points may be used for partitioning), the physical antenna separation distances may be used for partitioning in FIG. 4. For example, the antenna separation distance may be increased (e.g., maximized) for each respective partitioning. A set-partitioning may include a series of partitions that divide the antenna elements and/or constellation points into subsets within each respective partition. Each of the subsets in a respective partition may have an equal number of antenna elements and/or constellation points. The number of subsets may double for each respective partition. For example, a first partition may include two subsets and a second partition may include four subsets, etc. The total number of antenna elements and/or constellation points may remain constant for each respective partition.

A transmitter may have a plurality of antenna elements, e.g., eight antenna elements A1, A2, A3, A4, A5, A6, A7, A8 in the example of FIG. 4. The antenna elements A1, A2, A3, A4, A5, A6, A7, A8 may be evenly spaced. The antenna elements A1, A2, A3, A4, A5, A6, A7, A8 may be partitioned into a first partition 400. The antenna elements A1, A2, A3, A4, A5, A6, A7, A8 may be partitioned into (e.g., assigned to) two or more subsets 401, 402 of antenna elements. The antenna elements A1, A2, A3, A4, A5, A6, A7, A8 may be assigned to the antenna element subsets 401, 402 such that the distance between the respective antenna elements in the respective antenna element subsets 401, 402 is maximized. The first partition 400 may include a first antenna element subset 401 and a second antenna element subset 402. The first antenna element subset 401 may include antenna elements A1, A3, A5, A7. The second antenna element subset 402 may include antenna elements A2, A4, A6, A8.

The first antenna element subset 401 and the second antenna element subset 402 may be partitioned into a second partition 410. The second partition 410 may include a plurality of antenna element subsets 411, 412, 413, 414. The antenna elements A1, A2, A3, A4, A5, A6, A7, A8 may be assigned to the antenna element subsets 411, 412, 413, 414 such that the distance between the respective antenna elements in the respective antenna element subsets 411, 412, 413, 414 is maximized. For example, the antenna elements A1, A3, A5, A7 from the first antenna element subset 401 may be assigned to antenna element subsets 411, 413. The antenna elements A2, A4, A6, A8 from the second antenna element subset 402 may be assigned to antenna element subsets 412, 414. In the second partition 410, antenna elements A1, A5 may be assigned to antenna element subset 411, antenna elements A3, A7 may be assigned to antenna element subset 413, antenna elements A2, A6 may be assigned to antenna element subset 412, and antenna elements A4, A8 may be assigned to antenna element subset 414.

The antenna element subsets 411, 412, 413, 414 of the second partition 410 may be partitioned into a third partition 420. The third partition 420 may include a plurality of antenna element subsets 421, 422, 423, 424, 425, 426, 427, 428. The antenna elements from the antenna element subsets 411, 412, 413, 414 of the second partition 410 may be divided among the antenna element subsets 421, 422, 423, 424, 425, 426, 427, 428 of the third partition 420. The antenna elements A1, A5 from antenna element subset 411 may be assigned to antenna element subsets 421, 423 of the third partition 420. The antenna elements A3, A7 from antenna element subset 413 may be assigned to antenna element subsets 425, 427 of the third partition 420. The antenna elements A2, A6 from antenna element subset 412 may be assigned to antenna element subsets 422, 424. The antenna elements A4, A8 from antenna element subset 414 may be assigned to antenna element subsets 426, 428 of the third partition 420. For example, in the third partition 420, antenna element A1 may be assigned to antenna element subset 421, antenna element A5 may be assigned to antenna element subset 423, antenna element A3 may be assigned to antenna element subset 425, antenna element A7 may be assigned to antenna element subset 427, antenna element A2 may be assigned to antenna element subset 422, antenna element A6 may be assigned to antenna element subset 424, antenna element A4 may be assigned to antenna element subset 426, and antenna element A8 may be assigned to antenna element subset 428.

RPM based transmissions may use the antenna pattern spatial correlation coefficients described herein as a metric. The metric may be represented by Equation 1, where i and j refer to the i-th and j-th antenna patterns, $\Omega=(\phi,\theta)$ is the solid angle, and $E_i(\Omega)$ is the far-field radiation pattern of the i-th antenna pattern.

$$\rho_{i,j} = \frac{\int_{4\pi} E_i(\Omega)E_j^*(\Omega)d\Omega}{\sqrt{\int_{4\pi}|E_i(\Omega)|^2 d\Omega \int_{4\pi}|E_j(\Omega)|^2 d\Omega}} \quad (1)$$

Figure 5A:
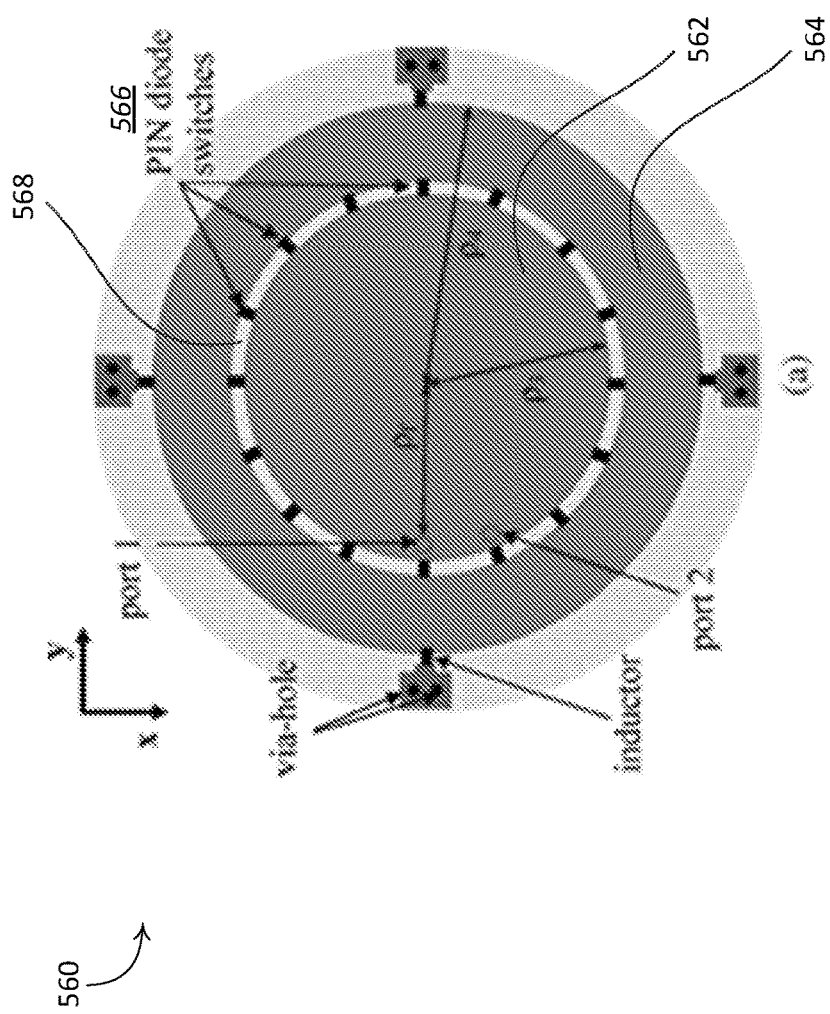
FIG. 5A shows an example antenna structure.
Figure 5B:
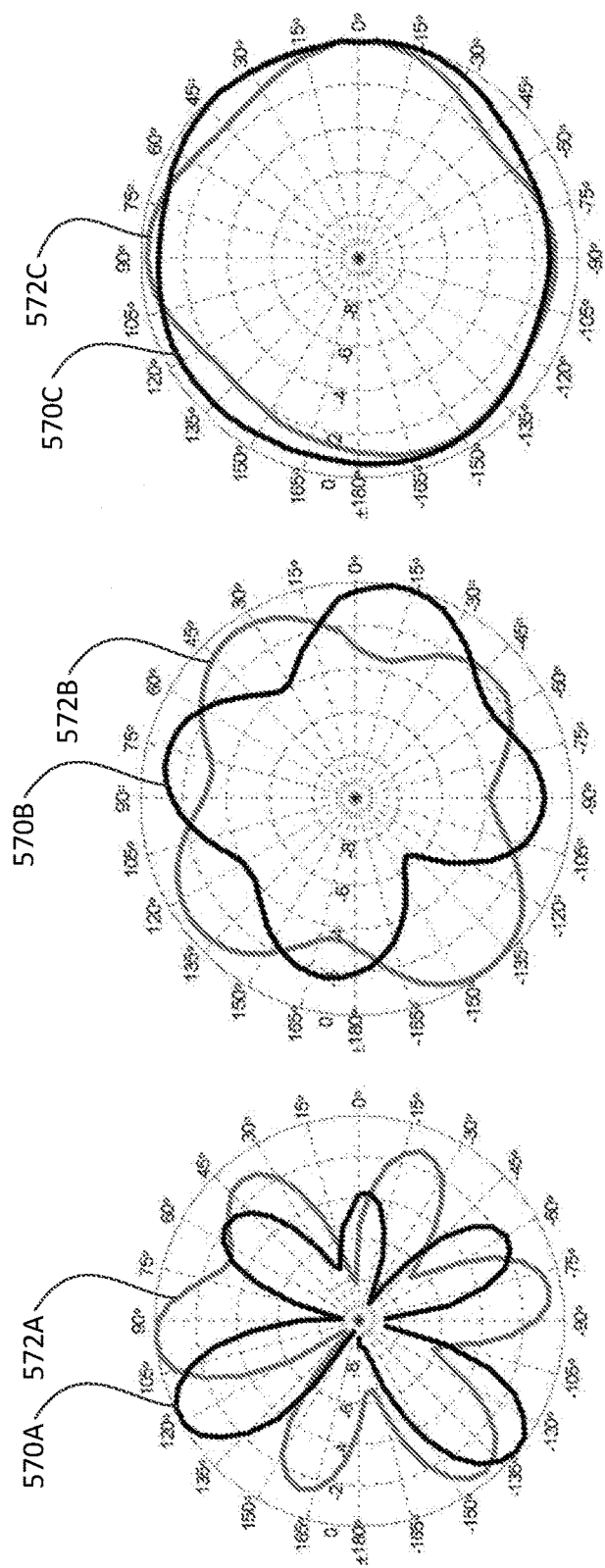
FIG. 5B shows example antenna patterns created by the antenna structure shown in FIG. 5A.

FIG. 5A shows an example antenna structure 560. FIG. 5B shows example antenna patterns created by the antenna structure 560 shown in FIG. 5A. The example antenna structure 560 may be an electronically configurable circular patch antenna. For example, the antenna structure 560 may include a solid circular patch 562 of a certain radius ρ3. The solid circular patch 562 may include one or more ports (e.g., port 1 and port 2, as shown). The antenna structure 560 may include a donut shaped conductor 564, for example, surrounding the solid circular patch 562. The donut shaped conductor 564 may define an outer radius ρ4. One or more PIN diode switches 566 may be placed between the solid circular patch 562 and the donut shaped conductor 564 to electrically connect/disconnect the two conductors, thus creating different radiation patterns (e.g., as shown in FIG. 5B). For example, the antenna structure 560 may define a gap 568 between the solid circular patch 562 and the donut shaped conductor 564. The PIN diode switches 566 may be placed within the gap 568. One or more additional switches can be placed (e.g., strategically placed), for example, to create different polarizations. An electronically reconfigurable antenna may be constructed in various ways.

As shown in FIG. 5B, the example antenna structure 560 may generate various (e.g., one or more) antenna patterns. The antenna structure 560 may generate various patterns based on a number of and/or a location of the PIN diode switches 566. The antenna structure 560 may generate various patterns based on a number of and/or a location of the ports. For example, the antenna structure 560 may generate a first antenna pattern 570A via a first port (e.g., port 1 shown in FIG. 5A) and a second antenna pattern 572A via a second port (e.g., port 2 shown in FIG. 5A). The antenna structure 560 may generate a third antenna pattern 570B via the first port and a fourth antenna pattern 572B via the second port. The antenna structure 560 may generate a fifth antenna pattern 570C via the first port and a sixth antenna pattern 572C via the second port.

For $N_p$ antenna patterns, $$\binom{N_p}{2}$$

spatial correlation values $$\left(e.g., \binom{n}{k} = \frac{n!}{k!(n-k)!} \text{ or "} n \text{ choose } k\text{"}\right)$$

may or may not be equally spaced (e.g., as is the case for antenna separation distances). When the values are not equally spaced, set-partitioning may become complex. An example approach may be used, as illustrated in FIG. 4 and described herein (with example eight antenna patterns).

$$\binom{8}{2}$$

spatial correlation values may be computed.

$$\frac{1}{2}\binom{8}{4}$$

options that may possibly be used for the first partition may be listed. For the second partition, the corresponding $$\frac{1}{2}\binom{4}{2}$$

possible options for each of the two partition branches may be listed. A partition (e.g., the best partition) may be selected that satisfies the rule that the minimum distance is maximized for each successive partition. In the example set-partitioning shown in FIGS. 3 and 4, there may be $$\left[\left(\frac{1}{2}\binom{8}{4}\right)\left(\frac{1}{2}\binom{4}{2}\right)^2\right]$$

possible ways to partition the original eight patterns or elements. The number of candidate partitioning options may be expressed as Equation 2, where P may represent the number of required partitions minus one. As illustrated in FIGS. 3 and 4, in at least some cases, there may be one way (e.g., a single way) to create a final partition. For example, the final partition may include a group of subsets, each of the subsets having a single pattern or element. As such, the creation of such final partition may not be required in the approach described herein.

$$N = \prod_{i=0}^{P-1} \binom{2^{P-i+1}}{2^{P-i}} 2^i \tag{2}$$

Set-partitioning may be based on channel related information (e.g., based on CSI). The channel related information may be associated with an antenna pair. For example, the channel related information may be associated with a transmit/receive antenna pair. As discussed herein, set-partitioning for spatial and/or antenna based modulation may be performed based on one or more pre-determined metrics (e.g., in ways similar to the signal space mechanisms used in some TCM techniques). The actual spatial constellations for SSK and RPM may be channel dependent, and may or may not be fixed. Set-partitioning that is based on channel related information (e.g., such as CSI) may be used to enhance performance. For example, the physical antenna distances that may be used as a non-channel related metric (e.g., as shown in FIG. 4) may be suitable for set-partitioning that uses channel related information (e.g., dependent on the received signal correlation properties). For channel information based (e.g., CSI-based) set-partitioning, a training sequence may be used. For example, a receiver may determine the channel related information based on one or more pilot signals, for example, received during the training period. A training sequence sent by a transmitter may be a-priori known at the receiver. When the receiver knows the training sequence (e.g., a-priori), the receiver may estimate the channel through which the signal propagated. The channel may include both the transmit and receive antenna patterns. Orthogonal sequences may be transmitted for each antenna and/or antenna pattern, for example, in order to obtain a separate estimate of the channel from each of the transmit antennas and/or antenna patterns. Orthogonality may be obtained in the time domain, for example, by transmitting the training sequences from the different antennas and/or antenna patterns sequentially in time. The receiver may receive and process (e.g., separately) the training sequences from each of its receive antennas, for example, so that a separate channel estimate may be determined for each transmit/receive antenna pair. The channel estimates may be used to determine various channel related information between each transmit/receive antenna pair that may be used in a set-partitioning algorithm.

A receiver may determine a suitable distance metric between the physical antennas for SSK, antenna patterns for RPM, or a combination of the foregoing (e.g., receive channel cross correlations). For example, one or more channel cross correlation coefficients may be used for set-partitioning. The partitioning (e.g., set-partitioning) may be performed at the receiver and/or transmitter. When partitioning is performed at the receiver, the receiver may configure (e.g., subsequent to the partitioning) its decoder and send feedback (e.g., the applicable information) to the transmitter. The feedback may enable the transmitter to configure a corresponding encoder. For example, the transmitter may configure a corresponding encoder based on the feedback received from the receiver. When partitioning is performed at the transmitter, the receiver may send feedback to the transmitter that includes the actual metric (e.g., channel related information). The transmitter may perform the partitioning based on the feedback, configure its encoder, and transmit the control information for configuring the corresponding decoder prior to data transmissions. As another example, if the same set-partitioning algorithm is used at the transmitter and receiver, the receiver may run its set-partitioning algorithm and may configure its decoder based on one or more channel metrics. The receiver may feedback the channel metrics used to configure its decoder to the transmitter. The transmitter may run (e.g., independently run) its algorithm and configure the decoder, for example, since it may be assumed that the transmitter is using the same set partitioning algorithm A transmitter-receiver architecture may be designed for joint coded spatial and/or antenna based modulation (e.g., when set-partitioning is based on channel related information such as CSI). To illustrate, an example is provided herein for a joint coded SSK based system (e.g., using channel information based set-partitioning). The concept and ideas described herein may be applied to other types of systems including, for example, RPM or combined SSK and RPM.

Figure 6:
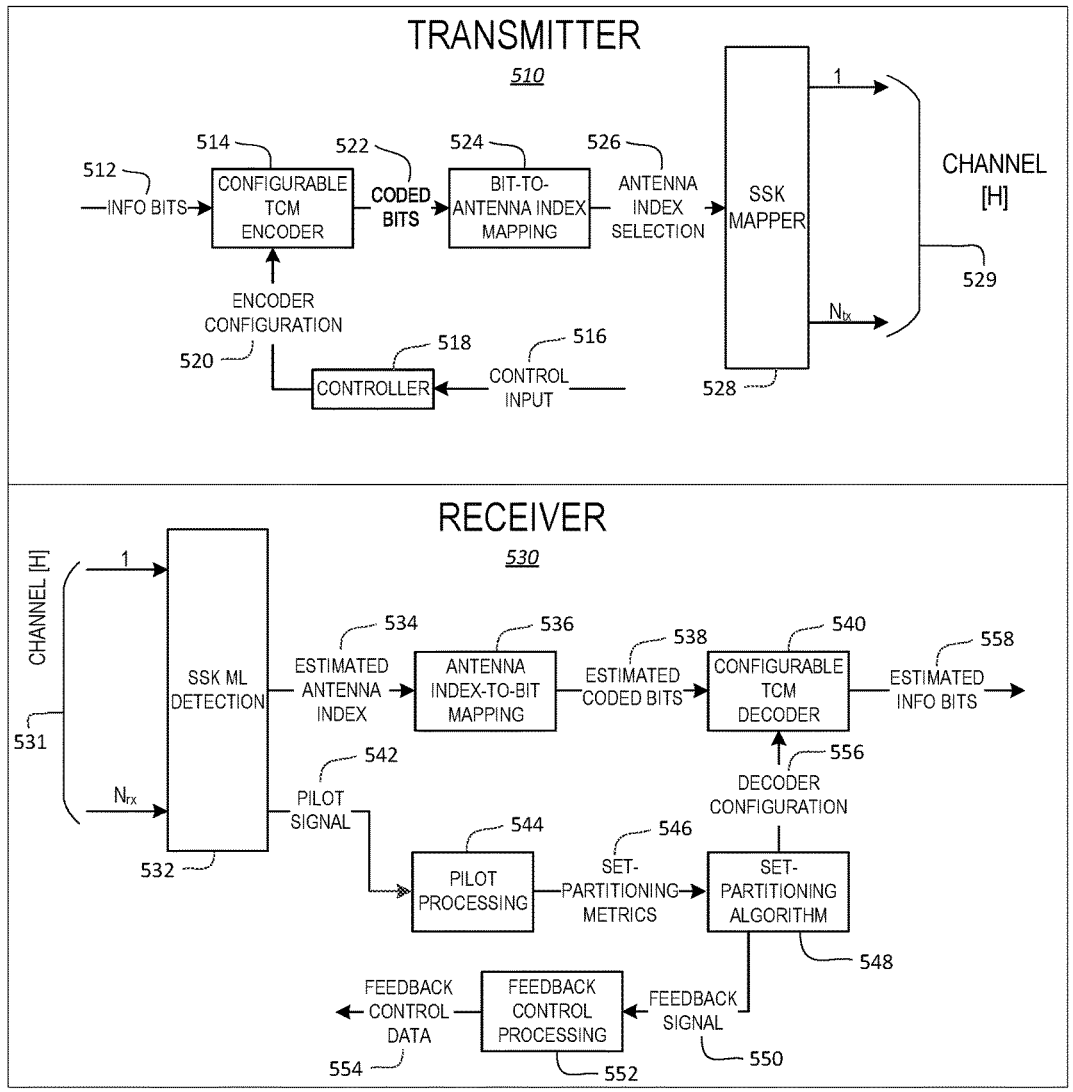
FIG. 6 is an illustration of an example architecture for a joint coded SSK based transmitter-receiver that utilizes channel related information.

FIG. 6 shows a block diagram of an example baseband transmitter and receiver architecture for a joint coded SSK based system (e.g., using channel information based set-partitioning). The system may include a transmitter 510 and a receiver 530. The transmitter 510 may be a user device such as a WTRU, a network device such as an eNodeB, etc. The receiver 530 may be a user device such as a WTRU, a network device such as an eNodeB, etc. The transmitter 510 may include one or more of the following characteristics. Information bits 512 may be input to a configurable TCM encoder 514. The TCM encoder 514 may be configured based on feedback control information from the receiver 530. The configurable TCM encoder 514 may be dynamically configurable. For example, the configuration of the configurable TCM encoder 514 may by updated as channel conditions change. A controller 518 may receive a control input 516 from the receiver 530. The control input 516 may include the feedback control information. The controller 518 may determine an encoder configuration 520 based on the control input 516. Coded bits 522 may be output to an SSK modulator. The bits 522 may be used for a bit-to-antenna index mapping 524. An antenna index selection 526 may be performed, for example, using the bit-to-antenna index mapping 524. The bits 522 may be grouped, for example, according to the total number of transmit antennas 529. The bits 522 may be mapped to a signal that controls the antenna selection (e.g., a SSK mapper 528). The transmitter 510 may send the bits 522 to the receiver 530 via one or more transmit antennas 529. Each transmit antenna of the transmit antennas 529 may include one or more individual antenna elements. When a certain antenna index is excited, one or more (e.g., all) of the various antenna elements associated with the certain antenna index may be excited. For example, each antenna element referenced by the certain antenna index may be weighted in a phased array sense, for example, to point a resulting radiation pattern in a certain direction.

The receiver 530 may include one or more of the following characteristics. The receiver 530 may have one or more receive antennas 531. A receive antenna (e.g., such as the receive antennas 531) may include one or more antenna elements. The receiver 530 may receive one or more signals via the receive antennas 531. The receiver 530 may include a main data processing path. The main data processing path may include one or more of SSK ML Detection 532, antenna index estimation 534, antenna index-to-bit mapping 536, coded bit estimation 538, or decoding using a configurable TCM decoder 540. Received signal(s) may be input to an SSK based detector 532. An antenna index 534 may be estimated. In the illustrated example, the SSK based detector 532 is shown as a maximum likelihood detector (MLD), which may be represented by Equation 3. In the equation, $\vec{j}$ is the estimated transmit antenna index, $\vec{y}$ is the received signal vector, $\sqrt{\rho}$ is the average SNR at each receive antenna, $\vec{h}_j$ is the j-th column vector from the estimated channel matrix. The receiver 530 may perform an antenna index-to-bit mapping 536. For example, the estimated antenna index 534 may be mapped to a bit sequence. The mapped and coded bits 538 may be used for decoding by the configurable TCM decoder 540.

$$\hat{j} = \underset{1 \le j \le N_T}{\operatorname{argmin}} \left\| \vec{y} - \sqrt{\rho}\, \vec{h}_j \right\| \qquad (3)$$

The receiver 530 may include a control processing path. The control processing path may include one or more pilot signals 542, a pilot processing 544, determining set-partitioning metrics 546, determining a set-partitioning algorithm 548, generating a feedback signal 550, a feedback control processing 552, and feedback control data 554. One or more pilot signals 542 may be received from the transmitter 510. The receiver 530 may receive the pilot signals 542 via the receive antennas 531. For example, before main data information is sent, a period of pilot signals 542 may be received from one or more of the $N_t$ transmit antennas (e.g., from each of the $N_t$ transmit antennas). Each of the pilot signals 542 may correspond to a respective transmit antenna. If each of the transmit antennas is electronically reconfigurable, a separate pilot signal may be associated with each respective antenna pattern from each physical antenna structure. For example, a first pilot signal may be associated with a first transmit antenna pattern of the first transmit antenna from the transmitter 510. A second pilot signal may be associated with a second transmit antenna pattern of the first transmit antenna from the transmitter 510.

The pilot signals 542 may be used, for example, for channel estimation. The receiver 530 may determine channel related information based on the pilot signals 542. Pilot processing may be performed on the one or more pilot signals 542. One or more set-partitioning metrics 546 may be determined from the pilot signals 542. The set-partitioning metrics 546 may include a suitable distance metric (e.g., one or more channel cross correlation coefficients) for one or more transmit antenna pairs (e.g., for each of the transmit antenna pairs). The set-partitioning metrics 546 (e.g., information associated with the distance metric) may be used for determining a set-partitioning algorithm 548 (e.g., a determination may be made to use the brute force approach as described herein). Based on the set-partitioning algorithm

548, a TCM decoder 540 (e.g., a configurable TCM encoder) may be configured for subsequent data reception. The configurable TCM decoder 540 may be configured using a decoder configuration 556 that is determined using the set-partitioning algorithm 548. The TCM decoder 540 may be a dynamically configurable TCM decoder. For example, the TCM decoder 540 may be configured dynamically as channel conditions change. One or more feedback signals 550 may be determined based on the pilot signals 542. The feedback signals 550 may be processed 552 to determine feedback control data 554. The feedback control data 554, the set-partitioning metrics 546, and/or the feedback signals 550 may be sent to the transmitter 510. The feedback control data 554 and/or the feedback signals 550 may be configured to enable a corresponding TCM encoder 514 to be configured (e.g., set) accordingly. Information bits 558 may be estimated by the configurable TCM decoder 540. Although not shown in the example shown in FIG. 6, the transmitter 510 may determine the set-partitioning. The transmitter 510 may configure the dynamically configurable TCM encoder 514 based on the determined set-partitioning.

Signaling support may be provided for channel information based (e.g., CSI-based) set-partitioning. As described herein, feedback information (e.g., feedback sent from the receiver to the transmitter) may be utilized for channel information based coded modulation. Various forms of receiver feedback may be designed for such purposes. For example, direct encoder configuration feedback may be employed. Under such an approach, suitable set-partitioning may be determined at the receiver. An encoder configuration may be determined at the receiver. The encoder configuration may be sent (e.g., as feedback) to the transmitter. The encoder may be designed to support a set of (e.g., a finite set of) set-partitioning configurations. An index (e.g., a simple index) may be used to configure the encoder.

Metric feedback may be employed to support channel information based (e.g., CSI-based) set-partitioning. One or more suitable metrics (e.g., channel cross correlations) may be determined at the receiver and sent (e.g., as feedback) to the transmitter. The transmitter may perform the set-partitioning based on the channel cross correlations and/or other suitable metrics. The transmitter may configure the encoder based on the channel cross correlations and/or the other suitable metrics.

In the examples described herein, feedback control information may be sent, along with other feedback information, on an appropriate control channel. When metric feedback is used, set-partitioning selection may be determined at the transmitter. When the set-partitioning selection is determined at the transmitter, the decoder may be configured before decoding is performed. Control information may be sent on a separate control channel or embedded, either explicitly or implicitly, in the PHY header.

Spatial and/or antenna based modulation (e.g., SSK) may be combined with other types of modulation such as signal space modulation. Joint coded modulation (e.g., TCM) may be performed in more than a single modulation domain/dimension (e.g., signal or space). More generally, the transmitter and/or receiver may be configured to utilize (e.g., simultaneously utilize) multiple domains/dimensions for information bearing (e.g., signal, space, antenna, frequency, time, etc.). Spectral efficiency may be increased as a result. An example will be described herein that focuses on combining spatial and/or antenna based modulation with signal space modulation. It will be appreciated, however, that the concepts described may be extended to other modulation domains and/or dimensions.

As discussed, TCM may be applied in the signal space as a one-dimensional modulation format. TCM may be extended to multidimensional signal sets. The multidimensional signal sets may still be within the signal space (e.g., 2×8-PSK may denote the combination of two 8-PSK signal sets in the signal space). With multidimensional TCM, set-partitioning may be performed based on the L-fold Cartesian product of individual signal space constellations, where L may represent the number of signal space sets used (e.g., L=2 in the 2×8-PSK example). In the example provided, the Cartesian product for the two 8-PSK signal sets may result in a 4-D signal space and may contain $2^{lL}$ signal points in the final signal set (e.g., l may be equal to 3 for 8-PSK).

Set-partitioning techniques may be based on a combination of fixed and a-priori known signal space constellation points. As discussed herein, SSK and RPM constellation points may not be fixed or a-priori known. When SSK and/or RPM is combined with certain signal space modulation methods, part of the multidimensional signal set may be fixed and/or a-priori known. The metric(s) used for set-partitioning with SSK and RPM may be based on non-channel related information (e.g., non-CSI based). The metric(s) used for set-partitioning with SSK and RPM may be based on channel related information (e.g., CSI based). The metrics that are based on non-channel related information may be built upon one or more properties such as physical antenna separation, antenna pattern correlation, etc. The metrics that are based on channel-related information may be built upon one or more properties such as the channel cross correlations. For example, channel related information may include one or more channel cross correlation coefficients.

When a spatial and/or antenna based metric (e.g., one based on non-channel related information) is combined with a signal space metric, the corresponding set-partitioning algorithm may be designed based on a combination of single dimension signal space partitioning and spatial and/or antenna partitioning (e.g., such as the brute force approach described herein). If partitioning is based on channel related information, fixed signal space partitioning may be combined with semi-static partitioning (e.g., as described herein). In that case, improvements may be possible if the signal space partition is semi-statically and/or jointly determined with the spatial and/or antenna based partition. Complexity of the overall partitioning may increase if the signal space partition is semi-statically and/or jointly determined with the spatial and/or antenna based partition.

A system utilizing spatial modulation (SM), MIMO, and/or low-density parity-check (LDPC) (e.g., a SM-MIMO-LDPC system) may be implemented with iterative decoding. Such a system may use concatenated codes. Concatenated codes may provide enhanced performance in certain applications. One class of concatenated codes may be the Parallel Concatenated Gallager Codes (PCGC). The concatenated codes (e.g., the PCGCs) may be used with signal space modulation, for example. As described herein, SM-MIMO may use the spatial domain as well as the signal domain to bear information. Energy efficiency may be enhanced as a result of using the spatial and signal domains. A SM-MIMO-LDPC system may be capable of bringing together the energy efficiency aspects of SM-MIMO and the enhanced channel coding performance of PCGC. A SM-MIMO-LDPC system may expand the capabilities of a signal space based PCGC implementation, for example by utilizing the spatial domain aspects of SM-MIMO.

As described herein, spectral efficiency and/or energy efficiency may be achieved using joint modulation and spatial encoding techniques. Joint modulation and spatial encoding may enhance the performance of MIMO transceivers. Information available to the channel encoder and/or decoder may be utilized. The information may include, for example, LDPC codes. The LDPC codes may be good error correcting codes (e.g., similar to turbo codes). LDPC codes may be applied to MIMO systems. LDPC codes applied to MIMO systems may be referred to as MIMO-LDPC codes, or a LDPC system.

The SM-MIMO-LDPC system may utilize spatial modulation (e.g., with iterative decoding). A LDPC design may include one encoder and one decoder. A LDPC design may include a parallel concatenated Gallager code with two LDPC encoders in parallel and two corresponding decoders in serial. The latter LDPC design may enhance system performance, for example, by adjusting the mean column weight of one or more of the encoders and/or decoders (e.g., each of the encoders and decoders) to suit different SNR operating points. Spatial modulation may be used in series with the parallel LDPC encoders.

Figure 7:
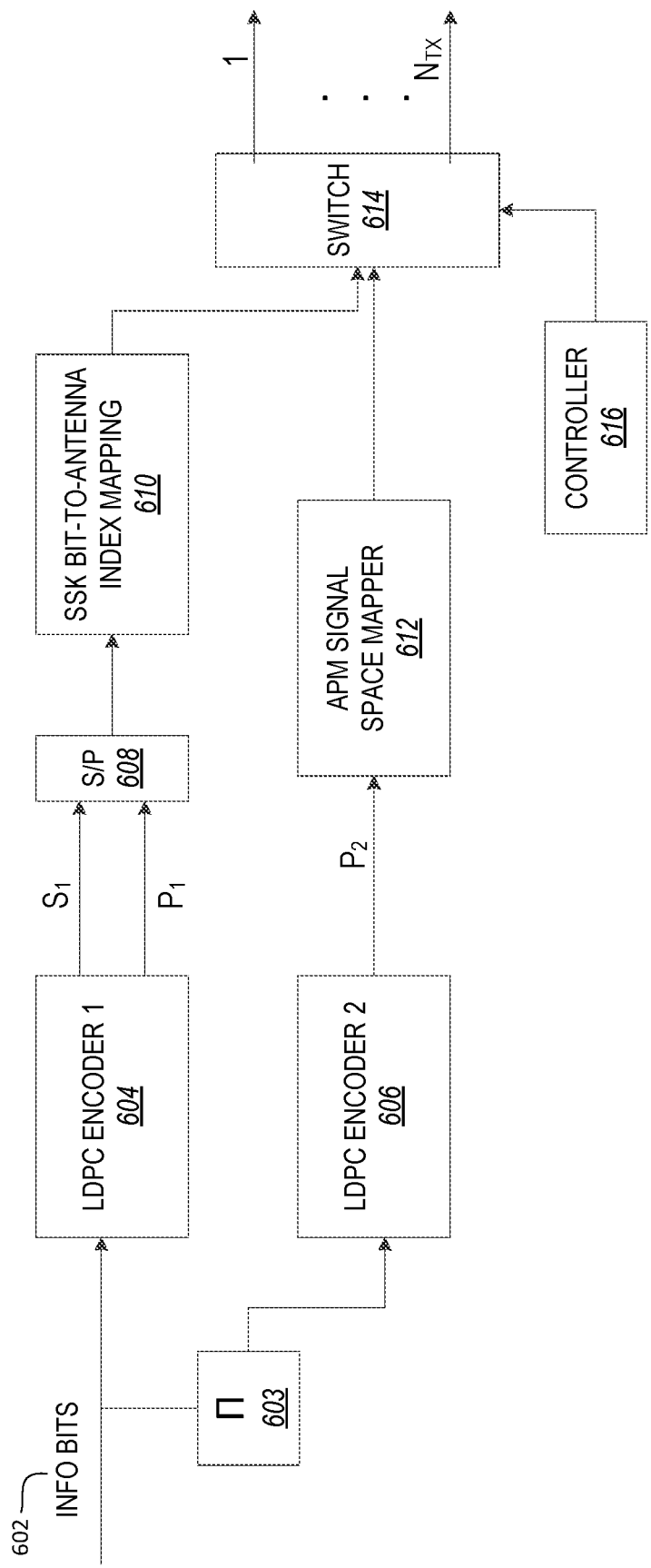
FIG. 7 is an illustration of an example SM-MIMO-LDPC transmitter.

FIG. 7 shows a diagram of an example SM-MIMO-LDPC transmitter. The transmitter may receive information bits 602 (e.g., data bits). The transmitter may include an interleaver 603 that may interleave the information bits 602. The data bits 602 may be encoded by a first LDPC encoder 604. The interleaved data bits may be encoded by a second LDPC encoder 606. The output information $S_1$ and parity $P_1$ bits from the first LDPC encoder 604 may be multiplexed 608 and mapped 610 for SSK modulation. The parity bits $P_2$ from the second LDPC encoder 606 may be modulated 612, for example, using signal space techniques. The data stream may be delivered to the antennas through a spatially modulated switch 614 (e.g., similar to a spatially modulated system). The spatially modulated switch 614 may receive information from a controller 616.

Figure 8:
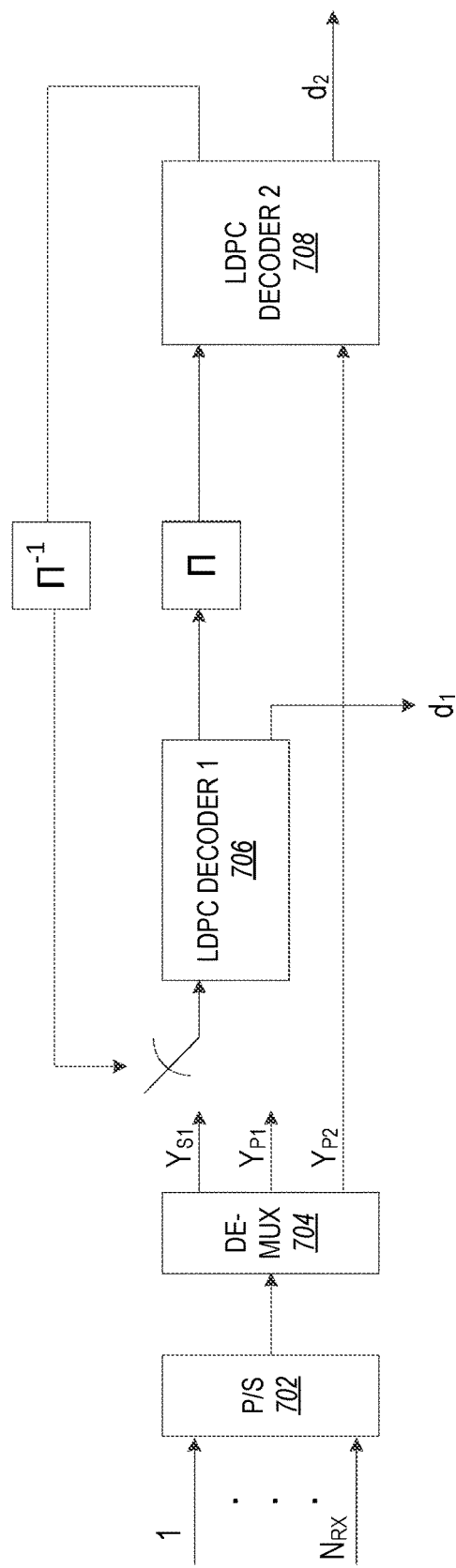
FIG. 8 is an illustration of an example SM-MIMO-LDPC receiver.

FIG. 8 depicts an example SM-MIMO-LDPC receiver. Signals received at a receiving antenna may be converted to a serial data stream. The received signals may be serialized 702 and/or de-multiplexed 704. Demodulated data bits may be represented by $y_s$, and the parity bits from one or more encoders (e.g., the first LDPC Encoder 604 and the second LDPC Encoder 606 shown in FIG. 7). The parity bits from the one or more encoders may be represented by $y_{p1}$ and $y_{p2}$ respectively. A first LDPC decoder 706 may implement a belief propagation (BP) algorithm using $y_s$ and $y_{p1}$. If the first LDPC decoder 706 is able to decode a probable solution (e.g., the most probable solution) for the received vector, the first LDPC decoder 706 may output a hard decision at $d_1$ and the decoding operation may be stopped. Otherwise, the output of the first LDPC Decoder 706 may indicate how likely a received bit may correspond to an information bit. The likelihoods may be interleaved and the interleaved likelihoods may be input to a second LDPC decoder 708.

The second LDPC decoder 708 may implement a brief propagation algorithm using the interleaved likelihoods and/or the parity bits from an encoder (e.g., the second LDPC Encoder 606 as shown in FIG. 7). If a solution is found, the hard bits may be output to $d_2$. Otherwise, the likelihoods of the second decoded bits may be input to the first LDPC decoder 706, e.g., after an inverse interleaving operation. The operation may continue until a maximum iteration count is reached, and/or a solution for the received bits is found by the second LDPC decoder 708. The decoded hard bits may then be available at $d_2$.

At the transmitter, spatial modulation may be controlled by a feedback controller. The feedback controller may use channel states, SINR, log-likelihoods, and/or other parameters to schedule which antenna(s) are to be used for transmission at a particular time instant. Using the iterative decoding described herein, it may be possible to use the probability of $d_1$, and/or $d_2$ decisions to control the probability of using a particular antenna.

Although the descriptions provided herein focus on one group of antennas, the concepts may be applicable to groups of antennas. For example, each antenna shown in FIGS. 6 and 7 may be replaced by a group of antennas that are jointly spatially multiplexed, and/or pre-coded.

Although features and elements are described above in particular combinations, one of ordinary skill in the art will appreciate that each feature or element can be used alone or in any combination with the other features and elements. And although the solutions described herein consider 5G specific protocols, it is understood that the solutions are not restricted to those protocols and may be applicable to other wireless systems as well. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A first device comprising:
a receiver configured to:
  receive a first pilot signal from a second device, wherein the first pilot signal is associated with a first transmit antenna of the second device; and
  receive a second pilot signal from the second device, wherein the second pilot signal is associated with a second transmit antenna of the second device;
a processor configured to:
  determine, based on the first pilot signal and the second pilot signal, channel related information associated with an antenna pair;
  determine a set-partition based on at least the channel related information and a spatial or antenna based modulation; and
  configure, based on the determined set-partition, a dynamically configurable trellis coded modulation (TCM) decoder to decode data received from the second device; and
a transmitter configured to send feedback to the second device indicating the determined set-partition.

2. The first device of claim 1, wherein, when determining the set-partition, the processor is configured to:
partition a higher order signal space constellation into a first group of lower order constellation subsets, wherein the higher order signal space constellation includes a plurality of constellation points, and wherein each of the plurality of constellation points is assigned to a respective constellation subset in the first group;

partition each of the constellation subsets in the first group into a second group of constellation subsets, wherein each of the plurality of constellation points in each of the constellation subsets in the first group is assigned to a respective constellation subset in the second group; and map a set of bits to the plurality of constellation points assigned to the second group of constellation subsets.

3. The first device of claim 2, wherein a minimum distance between the plurality of constellation points is increased with each partitioning, and wherein the first group of constellation subsets and the second group of constellation subsets have a same respective number of constellation points as the higher order signal space constellation.

4. The first device of claim 1, wherein, when determining the set-partition, the processor is configured to:
   determine one or more spatial correlation coefficients for a set of transmit antennas that includes the first transmit antenna and the second transmit antenna; and
   determine, based on the one or more spatial correlation coefficients, a plurality of subsets of the set of transmit antennas, wherein a minimum distance between transmit antennas in each subset of the plurality of subsets is maximized.

5. The first device of claim 1, wherein the channel related information comprises one or more channel cross correlation coefficients.

6. The first device of claim 1, wherein the feedback enables the second device to configure a dynamically configurable TCM encoder of the second device that corresponds to the dynamically configurable TCM decoder of the first device.

7. The first device of claim 1, wherein the feedback includes one or more of the channel related information and an antenna index associated with the determined set-partition, and wherein the feedback is sent via one or more of a control channel and a PHY header.

8. The first device of claim 1, wherein the antenna pair is a transmit/receive antenna pair, and wherein the first pilot signal is associated with a first transmit antenna pattern, and wherein the second pilot signal is associated with a second transmit antenna pattern.

9. The first device of claim 1, wherein the first device is a wireless transmit/receive unit (WTRU), and the second device is an eNodeB, an access point (AP), or a base station.

10. The first device of claim 1, wherein the first pilot signal is associated with one or more of a first antenna pattern and a first antenna polarization, and wherein the second pilot signal is associated with one or more of a second antenna pattern and a second antenna polarization.

11. The first device of claim 1, wherein the receiver is configured to receive the data from the second device, and wherein the processor is configured to:
   determine an estimated antenna index,
   map the estimated antenna index to a bit sequence of the data, and
   decode the mapped bit sequence using the dynamically configurable TCM decoder.

12. A method of joint coded modulation comprising:
   receiving a first pilot signal from a device, wherein the first pilot signal is associated with a first transmit antenna of the device;
   receiving a second pilot signal from the device, wherein the second pilot signal is associated with a second transmit antenna of the device;
   determining, based on the first pilot signal and the second pilot signal, channel related information associated with an antenna pair;
   determining a set-partition based on at least the channel related information and a spatial or antenna based modulation;
   configuring, based on the determined set-partition, a dynamically configurable Trellis Coded Modulation (TCM) decoder to decode data received from the device; and
   sending feedback to the device indicating the determined set-partition.

13. The method of claim 12, wherein determining the set-partition comprises:
   partitioning a higher order signal space constellation into a first group of lower order constellation subsets, wherein the higher order signal space constellation includes a plurality of constellation points, and wherein each of the plurality of constellation points is assigned to a respective constellation subset in the first group;
   partitioning each of the constellation subsets in the first group into a second group of constellation subsets, wherein each of the plurality of constellation points in each of the constellation subsets in the first group is assigned to a respective constellation subset in the second group; and
   mapping a set of bits to the plurality of constellation points assigned to the second group of constellation subsets.

14. The method of claim 13, wherein a minimum distance between the plurality of constellation points is increased with each partitioning, and wherein the first group of constellation subsets and the second group of constellation subsets have a same respective number of constellation points as the higher order signal space constellation.

15. The method of claim 12, wherein determining the set-partition comprises:
   determining one or more spatial correlation coefficients for a set of transmit antennas that includes the first transmit antenna and the second transmit antenna; and
   determining, based on the one or more spatial correlation coefficients, a plurality of subsets of the set of transmit antennas, wherein a minimum distance between transmit antennas in each subset of the plurality of subsets is maximized.

16. The method of claim 12, wherein the channel related information comprises one or more channel cross correlation coefficients.

17. The method of claim 12, wherein the feedback enables the device to configure a dynamically configurable TCM encoder that corresponds to the dynamically configurable TCM decoder.

18. The method of claim 12, wherein the feedback includes one or more of the channel related information and an antenna index associated with the determined set-partition, and wherein the feedback is sent via one or more of a control channel and a PHY header.

19. The method of claim 12, wherein the antenna pair is a transmit/receive antenna pair, and wherein the first pilot signal is associated with a first transmit antenna pattern, and wherein the second pilot signal is associated with a second transmit antenna pattern.

20. The method of claim 12, further comprising:
receiving the data from the device;
determining an estimated antenna index;
mapping the estimated antenna index to a bit sequence of the data; and
decoding the mapped bit sequence using the dynamically configurable TCM decoder.

* * * * *